2,431,655

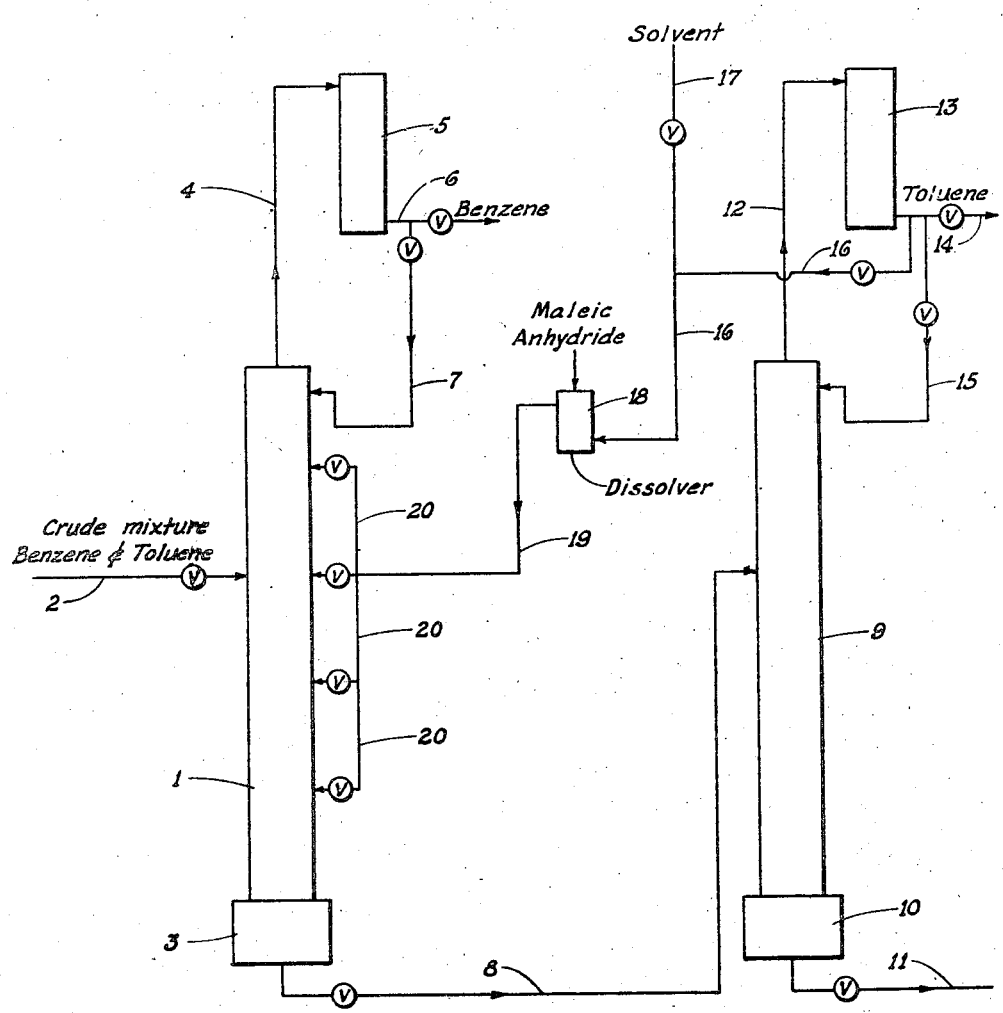
INVENTORS
James L. Amos
Kenneth E. Stober
BY
*Griswold & Burdick*
ATTORNEYS Patented Nov. 25, 1947

UNITED STATES PATENT OFFICE 2,431,655

METHOD OF DECOLORIZING AROMATIC HYDROCARBONS

James L. Amos and Kenneth E. Stober, Midland, Mich., assignors to The Dow Chemical Company, Midland, Mich., a corporation of Delaware Application October 21, 1943, Serial No. 507,100

1 Claim. (Cl. 202—57)

This invention concerns a method of decolorizing and purifying aromatic hydrocarbons made by pyrolytic processes.

In the manufacture of styrene by dehydrogenation of ethyl benzene the latter is pyrolyzed in vapor phase, and the reaction products are condensed to obtain a crude liquid condensate. This condensate is composed chiefly of styrene and unreacted ethyl benzene, but also contains substantial amounts of benzene and toluene as secondary reaction products, together with small amounts of impurities of indeterminate composition which discolor the condensate. The crude condensate is separated into its components by a distillation procedure in which a light fraction is first taken off, consisting principally of benzene and toluene. This light fraction, or fore-fraction, is then fractionally redistilled to separate the benzene and the toluene. Colored impurities in the crude condensate accompanying the benzene-toluene fraction, and these impurities persist through the subsequent redistillation of this fraction for separation of the benzene from the toluene, so that the distillation products are objectionably discolored and thus rendered unsuitable for many purposes. Usual decoloration methods, such as treatment with activated charcoal, sulphuric acid, etc., are unsuccessful in removing the discoloration or involve operating difficulties which render them poorly suited to commercial practice.

It is an object of the invention to devise a method for decolorizing the aforesaid benzene-toluene fraction to enable the recovery of water-white products by distillation of the same. Another object is to provide procedure for recovering toluene of nitration grade from such benzene-toluene fraction. A further object is to provide a purification method which can be employed co-incidentally with the fractional distillation of the said mixed fraction. Other objects will also appear from the following description of the invention.

We have discovered that the color-forming impurities may be removed by treating the discolored benzene-toluene fraction with maleic anhydride, followed by distillation, whereby the distillate is recovered free from color. Evidently, maleic anhydride combines with the colored impurities to form higher boiling compounds which remain in the residue upon distillation of the treated hydrocarbon material. The amount of maleic anhydride necessary to remove the color-forming impurities will vary with the intensity of the color of the starting material, or, in other words, with the amount of impurities present. In practice, we employ 0.05 pound or more, e. g., from 0.1 to 3 pounds and preferably between 0.1 and 1.5 pounds, of maleic anhyride per 100 pounds of the impure aromatic hydrocarbon to be decolorized. Maleic anhydride is soluble in a number of different aromatic hydrocarbons, including benzene, toluene, xylene, ethylbenzene, etc., hence it may be dissolved in the required amount in the impure mixed fraction and the latter then distilled to obtain a colorless distillate. In a preferred embodiment of the invention, the maleic anhydride is added directly to the column of a still as a solution of the same in benzene or toluene or other suitable solvent.

The distillation may be carried out batchwise or in continuous manner, using a single still or a series of stills, as desired. For example, maleic anhydride may be added to the benzene-toluene fraction in amount sufficient to decolorize the same, and the treated liquid distilled, first taking off a benzene fraction, and then continuing at a higher temperature to distill the toluene fraction. The maleic anhydride reaction products accumulate in the still and are withdrawn with the residue. For commercial operation it may be preferable to carry out a continuous distillation, in which the benzene is separated as overhead from a first still, from which the toluene is drawn off as liquid residue, and the latter distilled in a second still to obtain purified toluene as the overhead product.

The accompanying drawing is a diagrammatic sketch showing one arrangement of apparatus which may be employed for the continuous separation in colorless form of benzene and toluene from a discolored mixture thereof.

In the drawing, a distilling column 1 is provided near its midsection with a valved feed inlet 2 and at its lower end with a boiler 3 heated by means of steam coils. A vapor line 4 leads from the top of column 1 to a condenser 5 provided with a valved outlet pipe 6. Branching from pipe 6 is a valved reflux line 7 which connects with column 1 near its top. A valved liquor pipe 8 leads from the boiler 3 to the midsection of a second distilling column 9 which is provided at its lower end with a boiler 10 and with a valved outlet line 11. A vapor line 12 leads from the top of column 9 to a condenser 13 which is provided with a valved outlet line 14. A valved reflux line 15 branches from line 14 and connects with column 9 near its top. Another liquor pipe 16, which also branches from line 14, leads to a maleic anhydride dissolver 18. A valved inlet 17 is connected to line 16 from a source not shown. A valved liquor pipe 19 leads from dissolver 18 to column 1 through a header 20 connecting at different levels above and below inlet 2.

In the operation of the apparatus described in the drawing, the discolored benzene-toluene mixture is continuously fed into distilling column 1 through inlet 2, and a solution of maleic anhydride in toluene is added to the column through line 19 and header 20. At the start of the process, the toluene employed to dissolve the maleic anhydride is fed to the dissolver 18 through inlet 17. The benzene vapors from column 1 pass to condenser 5 from which the condensate is removed through outlet 6, a portion of this condensate being returned to column 1 for reflux.

The header 20 permits a selective adjustment of the treating procedure. The maleic anhydride solution introduced at any particular level of the column acts to decolorize the refluxing liquid in the column below the point of introduction. If this point is above feed inlet 2 both the benzene fraction concentrating in the upper part of the column and the toluene fraction concentrating in the lower part of the column may be treated. It is also possible to add the maleic anhydride solution to the top of the column in amount sufficient to treat the benzene fraction, but in amount insufficient to treat the toluene fraction being removed in the lower part of the column, obtaining in this instance a colorless benzene condensate and a colored fraction comprising the toluene. In commercial operation of the process the benzene taken off from column 1 is usually returned to the general styrene process to be alkylated to ethyl benzene which in turn is dehydrogenated to form styrene, and such returned benzene ordinarily need not be decolorized. Accordingly, it will be sufficient merely to decolorize the toluene fraction, in which case the maleic anhydride solution will be introduced into column 1 at a level below feed inlet 2.

Thus, when the maleic anhydride solution is introduced in sufficient amount at a level above inlet 2, the distilled benzene in the overhead stream will be colorless. The higher boiling constituents, including toluene and the maleic anhydride reaction products, accumulate as liquid in the lower part of the column and are continuously removed at the bottom through pipe 8. If sufficient maleic anhydride has been added to the column, the liquid withdrawn at the bottom will be colorless. However, if some color remains, additional maleic anhydride solution may be added to the bottom stream. The latter is fed to column 9, where toluene is distilled from the mixture, while the higher boiling residues, including the maleic anhydride reaction products, are withdrawn at the bottom of the column. The vapors from column 9 pass to condenser 13 from which colorless toluene is removed at outlet 14. One portion of the condensate is withdrawn as product, another is directed back to column 9 as reflux material, and another portion is passed to the maleic anhydride dissolver 18. The cycle now being complete, the necessity for the addition of toluene through inlet 17 is obviated.

As stated above, if it is not required to recover the benzene free from color, the maleic anhydride solution may be introduced into column 1 below the feed inlet 2, in which case only the toluene will be obtained colorless in carrying out the purification process. The purified and distilled toluene so recovered under correct operating conditions, providing sufficient maleic anhydride to remove impurities as well as sufficient fractionation in the distilling columns, responds to the specifications for nitration grade.

The following example illustrates results secured in carrying out the principle of our invention, but is not to be construed as limiting the same.

Example 1

A discolored benzene-toluene mixture obtained as a light fraction in distilling a crude styrene condensate, containing 55.8 per cent by weight of benzene, 38.4 per cent of toluene, and 5.8 per cent of ethyl benzene, was fed continuously into the midsection of a distilling column at the rate of 135 pounds per hour. The liquid was distilled at a head temperature sufficient to distill benzene, and with reflux at the rate of 375 pounds per hour, i. e. with a reflux ratio of 5:1. A 10 per cent solution of maleic anhydride in toluene was added to the column below the feed inlet at the rate of 0.45 pound maleic anhydride per hour. The benzene distillate had a yellow color, but was of better than 99 per cent purity. The still liquor from the bottom of the column contained 85.9 per cent of toluene, by weight, 13.2 per cent of ethyl benzene, 0.5 per cent of benzene, and 0.4 per cent of non-volatile material. Upon fractional distillation of the liquor colorless toluene of nitration grade is obtained.

Benzene, toluene, and other aromatic hydrocarbons made by other pyrolytic processes and containing colored impurities which tend to distill together with the hydrocarbons may be decolorized with maleic anhydride in a manner similar to that described above. For example, benzene and mono- and poly-alkyl benzenes obtained from coal tar may be treated with maleic anhydride and distilled batchwise or in continuous manner to produce colorless distillates.

Other modes of applying the principle of our invention may be employed, change being made as regards the method herein disclosed, provided the step or steps stated by any of the following claims or the equivalent of such stated step or steps be employed.

We therefore particularly point out and distinctly claim as our invention:

In a continuous distillation of a mixture of benzene and toluene containing a colored impurity incidental to their manufacture and which tends to distill together with the benzene and toluene, the steps which consist in fractionally distilling said mixture in a continuous manner to distill benzene from the mixture and leave toluene in the residue while adding to the distilling column a solution of maleic anhydride and a solvent therefor selected from the class consisting of benzene and toluene at a point in the column below the feed inlet of the impure mixture where the toluene is refluxing in concentrated form, the maleic anhydride being thus added in amount at least chemically equivalent to the amount of colored impurity in the fraction refluxing at this point, withdrawing from the column a liquid fraction containing the toluene, and distilling the latter to separate substantially colorless toluene therefrom.

JAMES L. AMOS.
KENNETH E. STOBER.

REFERENCES CITED

The following references are of record in the file of this patent:

UNITED STATES PATENTS

| Number | Name | Date |
|---|---|---|
| 2,104,956 | Stern et al. | Jan. 11, 1938 |
| 1,701,988 | Torrey et al. | Feb. 12, 1929 |

FOREIGN PATENTS

| Number | Country | Date |
|---|---|---|
| 352,164 | Great Britain | July 9, 1931 |

OTHER REFERENCES

Publication by Bachman and Goebel in Journal of American Chemical Society, vol. 64, pages 787–790, April 1942, copy of which is found in the Scientific Library of this office and in Div. 31, Class 260, sub. 681.5.

"Elements of Fractional Distillation," by C. S. Robinson, pages 67, 109, 113, 114, published by McGraw-Hill Book Co., New York, 1922, copy of which is found in Div. 25 of this office.